UNITED STATES PATENT OFFICE 2,673,876

PREPARATION OF ORGANIC PHOSPHORUS COMPOUNDS

William T. Dye, Jr., Dayton, Ohio, assignor to Monsanto Chemical Company, St. Louis, Mo., a corporation of Delaware No Drawing. Application July 24, 1950, Serial No. 175,647

5 Claims. (Cl. 260—545)

The present invention relates to the preparation of organic phosphorus compounds. More specifically, it provides an improved process for the preparation of pentakis(di-N-substituted amido) triphosphates having the general formula

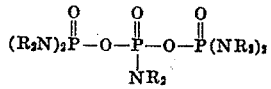

in which R is selected from the class consisting of alkyl, cycloalkyl and aryl radicals of from 1 to 6 carbon atoms. Compounds having the above general formula form the subject matter of my copending application, Serial No. 162,823, filed May 18, 1950, now U. S. Patent No. 2,610,139.

As illustrative of compounds having the above general formula may be mentioned pentakis(dimethylamido) triphosphate, pentakis(diethylamido) triphosphate, pentakis(diphenylamido) triphosphate, pentakis(dicyclohexylamido) triphosphate, tetrakis(dimethylamido) diethylamidotriphosphate, pentakis(di-n-butylamido) triphosphate, pentakis(diisohexylamido) triphosphate, etc. The compounds are advantageously employed as contact and/or systemic pesticides, and are particularly valuable as systemic pesticides.

The copending application referred to above provides a method for producing compounds having the above general formula by reaction of a bis(di-N-substituted amido) phosphoryl halide with a diester of a di-N-substituted amidophosphoric acid, e. g., bis(dimethylamido) phosphoryl chloride was reacted with diethyl dimethylamidophosphate to yield pentakis(dimethylamido) triphosphate.

Now I have found that better yields of the pentakis(di-N-substituted amido) triphosphates are obtained by condensing a (di-N-substituted amido) phosphoryl dihalide with an ester of a bis(di-N-substituted amido) phosphoric acid according to the scheme

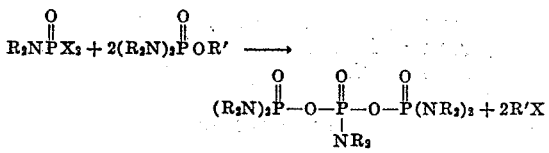

in which R is as defined above, R' is a member of the class consisting of alkyl, cycloalkyl and aralkyl radicals of from 1 to 7 carbon atoms and X is a halogen selected from the class consisting of bromine and chlorine. As examples of di-N-substituted amidophosphoryl dihalides useful for the present purpose may be mentioned dimethylamidophosphoryl dichloride, diethylamidophosphoryl dibromide, diisobutylamidophosphoryl dichloride, di-n-hexylamidophosphoryl dibromide, dicyclohexylamidophosphoryl dichloride, diphenylamidophosphoryl dichloride, etc. The di-N-substituted amidophosphoryl dihalides are readily obtainable by reaction of secondary amine hydrochlorides, e. g., dialkylamine hydrochlorides, with a large excess of phosphorus oxychloride substantially according to the method of Michaelis (Ann. 326 179 (1903)). Examples of useful esters of bis(di-N-substituted amido) phosphoric acids are methyl bis(dimethylamido) phosphate, ethyl bis(dicyclohexylamido) phosphate, butyl bis(diphenylamido) phosphate, n-hexyl bis-(di-n-amylamido) phosphate, cyclohexyl bis(dimethylamido) phosphate, benzyl bis(di-n-propylamido) phosphate, etc. Alkyl esters of the bis-(di-N-substituted amido) phosphates in which the alkyl radical has from 1 to 6 carbon atoms are preferred.

Depending upon the nature of the individual reactants the condensation of the di-N-substituted amido phosphoryl dihalide with the ester of a bis(di-N-substituted amido) phosphoric acid to give the present pentakis(di-N-substituted amido) triphosphates may occur under varying conditions of temperature and pressure. While some of the desired product is formed by simply contacting the dihalide with the phosphate in any proportions, for optimum yields it is advantageous to employ stoichiometric quantities of the reactants, i. e., at least two moles of the phosphate per mole of dihalide, and to maintain the mixture of the two reactants at elevated temperatures, i. e., at temperatures of from, say, 50° C. to 200° C., and preferably at from 70° C. to 160° C., until the formation of the desired triphosphate is completed. Since the condensation is usually accompanied by evolution of a hydrocarbon halide, the point at which the reaction is completed is readily determined. In order to minimize formation of by-products and decomposition of the triphosphate, it is advantageous to discontinue heating as soon as evolution of hydrocarbon halide has ceased. Because the condensation occurs very readily, a heating time of only a few minutes to an hour is generally sufficient. When evolution of hydrocarbon halide has ceased, the triphosphate may be separated from the reaction mixture by distillation or by fractional crystallization. If distillation is employed in the separation, it should be effected as rapidly as possible, since lengthy heating is detrimental.

The condensation of the di-N-substituted amido phosphoryl dihalide with the bis(di-N-substituted amido)phosphate ester may be effected in the presence or absence of an inert solvent or diluent. While the use of a diluent is sometimes advantageous, particularly when working with large quantities of reactants, such a practice generally requires longer heating time, both during the condensation step and in the separation procedure. Inert solvents or diluents which may be used include xylene, petroleum ether, toluene, etc.

When operating in the presence of a solvent or a diluent and employing stoichiometric quantities of the reactants, the crude reaction product may often be employed as such for many purposes.

The advantages of the present invention reside not only in the production of improved yields of the desired products (from 70 per cent to 80 per cent versus 50 per cent to 60 per cent by the prior process) but also in the better availability of the initial materials employed for the present process.

The invention is further illustrated, but not limited, by the following examples:

*Example 1*

0.156 mole (25.3 g.) of dimethylamidophosphoryl dichloride and 0.35 mole (58.1 g.) of methyl bis(dimethylamido)phosphate were mixed and slowly warmed. The evolution of methyl chloride was evident at a temperature of about 70° C. and at about 140° C., gas evolution was very vigorous. Heating was discontinued when the temperature reached 165° C. The reaction mixture was then cooled, filtered and distilled to give 43 g. (73 per cent theoretical yield) of substantially pure pentakis(dimethylamido)triphosphate, analyzing 16.60 per cent nitrogen (calculated for nitrogen, 17.82 per cent).

*Example 2*

0.15 mole (24.3 g.) of dimethylamidophosphoryl dichloride and 0.32 (57.6 g.) of ethyl bis(dimethylamido)phosphate were mixed together and heated. Evolution of ethyl chloride began at a temperature of 85° C. The temperature was raised to 150° C. within a period of 5 minutes, at which temperature evolution of ethyl chloride was very rapid. During the subsequent 10 minutes the temperature was increased to 200° C., and heating was then discontinued. The clear reaction mixture was cooled and distilled to give 41 g. (70 per cent theoretical yield) of substantially pure pentakis(dimethylamido)triphosphate, analyzing 17.43 per cent nitrogen.

Preparation of other pentakis(di-N-substituted amido)triphosphates in which the substituent is a saturated hydrocarbon radical of from 1 to 6 carbon atoms may be similarly effected, the dimethylamidophosphoryl dichloride of the above examples being replaced by other di-N-substituted amidophosphoryl dihalides and the methyl or ethyl bis(dimethylamido)phosphate by other bis-(di-N-substituted amido)phosphate esters.

In some instances, in order to decrease heating time or temperature, it may be advisable to operate at above or below atmospheric pressures. Rapid removal of the hydrocarbon halide as it is evolved, e. g., by evacuation or by sweeping out with an inert gas, may also accelerate the reaction and permit the use of lower temperatures.

What I claim is:

1. The method which comprises heating, at a temperature of from 50° C. to 200° C., one mole of a dialkylamidophosphoryl dihalide having the formula

in which R is an alkyl radical of from 1 to 6 carbon atoms and X is selected from the class consisting of chlorine and bromine with at least 2 moles of an amido-phosphate having the formula

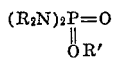

in which R and R' are alkyl radicals of from 1 to 6 carbon atoms and recovering from the resulting reaction product a pentakis(di-N-alkyl)amidophosphate having the formula

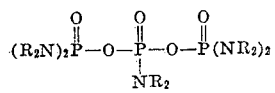

in which R is an alkyl radical of from 1 to 6 carbon atoms.

2. The method which comprises heating, at a temperature of from 50° C. to 200° C., 1 mole of dimethylamidophosphoryl dichloride of the formula

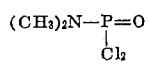

with at least two moles of an alkyl bis(dimethylamido)phosphate having the formula

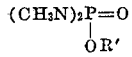

in which R' is an alkyl radical of from 1 to 6 carbon atoms and recovering from the resulting reaction product pentakis(dimethylamido)triphosphate of the formula

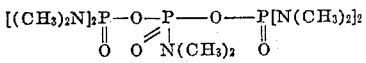

3. The method which comprises heating, at a temperature of from 50° C. to 200° C., 1 mole of dimethylamidophosphoryl dichloride of the formula

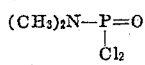

with at least 2 moles of a methyl bis(dimethylamido)phosphate of the formula

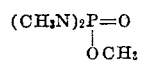

and recovering from the resulting reaction product pentakis(dimethylamido)triphosphate of the formula

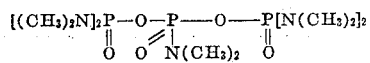

4. The method which comprises heating, at a temperature of from 50° C. to 200° C., 1 mole of dimethylamidophosphoryl dichloride of the formula

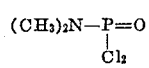

with at least 2 moles of an ethyl bis(dimethylamido)-phosphate of the formula

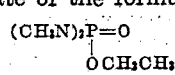

and recovering from the resulting reaction product pentakis(dimethylamido)triphosphate of the formula

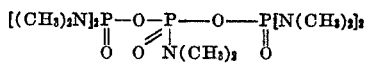

5. A method for the production of a bis (tetraalkyldiamidophosphoric) dialkylamidophosphoric dianhydride of the formula

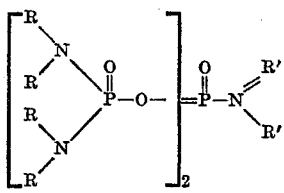

which comprises (1) admixing at least two molecular proportions of a compound of the formula

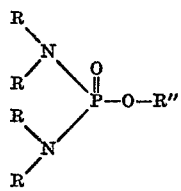

and one molecular proportion of a compound of the formula

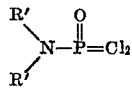

the symbols R, R' and R'' in said formula each representing an alkyl radical containing from 1 to 4 carbon atoms, inclusive, and (2) heating said mixture at a temperature of from 90° C. to 135° C. until the evolution of alkyl chloride of reaction is substantially complete.

WILLIAM T. DYE, Jr.

No references cited.